United States Patent [19]

Wood

[11] 4,131,768
[45] Dec. 26, 1978

[54] TELEPHONE SWITCH CONTROL CLIP

[75] Inventor: Reggie D. Wood, Pontiac, Mich.

[73] Assignee: Richard A. Campbell, Bloomfield Hills, Mich. ; a part interest

[21] Appl. No.: 728,921

[22] Filed: Oct. 4, 1976

[51] Int. Cl.² .......................... H01H 9/22; H04M 1/03
[52] U.S. Cl. ....................................... 179/178; 179/167
[58] Field of Search ............... 179/100 R, 103, 146 R, 179/147, 151, 158 R, 161, 167, 178, 189 R, 189 D, 179; 200/157, 323, 325, 327, 333, 334, 42 T, 50 R

[56] References Cited

U.S. PATENT DOCUMENTS

| 1,077,225 | 10/1913 | Keith | 179/103 |
| 3,802,657 | 4/1974 | Jackson | 179/146 R |
| 4,034,167 | 7/1977 | Boyd | 179/178 |

FOREIGN PATENT DOCUMENTS

| 121676 | 11/1926 | Switzerland | 179/167 |
| 18889 of | 1906 | United Kingdom | 179/167 |
| 112102 | 6/1917 | United Kingdom | 179/167 |

Primary Examiner—Kathleen H. Claffy
Assistant Examiner—Randall P. Myers
Attorney, Agent, or Firm—Basile and Weintraub

[57] ABSTRACT

A telephone switch control clip adapted for attachment to a conventional telephone instrument of the type having a hand-held receiver that is electrically connected to a cradle which functions to receive and support the receiver when not in use. The hand-held receiver is of the type that includes a push button for opening and closing the telephone circuit. The button is normally biased to an extended position for closing the telephone circuit. The positioning of the receiver onto the cradle moves the push button to a retracted position to terminate or to open the telephone circuit. The clip comprises a member having a contour closely following the peripheral shape of the grip portion of the receiver. The clip is movable relative to the receiver between a first position wherein a portion of the clip engages the push button and moves the same to its retracted position and a second position wherein the clip is moved relative to the receiver to disengaged from the push button to permit the same to assume its normal, extended position.

1 Claim, 4 Drawing Figures

TELEPHONE SWITCH CONTROL CLIP

BACKGROUND OF THE INVENTION

I. Field of the Invention

The present invention relates to a clip for attachment to a conventional telephone receiver and functions to selectively hold down and release the telephone push button.

II. Description of the Prior Art

Heretofore, devices have been constructed which function in a manner to permit the user of a conventional telephone to selectively maintain the telephone push buttons in an on or off position, as desired. These devices, such as the type disclosed in U.S. Pat. No. 3,226,491, are adapted to be used in conjunction with the telephone receiver for depressing, holding down, and releasing the spring urged pins on the conventional telephone instrument. Such conventional spring urged pins are normally held down to open the circuit in the telephone instrument by the weight of the telephone receiver, and such spring urged pins are free to be moved upwardly to close the telephone circuit when the receiver is moved from the cradle. Devices of the type disclosed in the aforementioned patent are adapted for attachment to the cradle of the telephone receiver in such a manner that the spring urged pins in the telephone can be pushed down, held down, and released by push-button controls on the device. The push-button controls are so designed that the receiver can be taken off the cradle and placed on the cradle of an auxiliary unit or the like without the necessity of repeatedly exchanging the receiver between the cradle of the telephone unit and the cradle and an auxiliary unit. In more recent times, more convenient and streamlined telephones have been constructed and provided to the public. In the streamline units the spring urged pin is carried by the hand-held set, and the pins are normally held down to open the circuit in the telephone instrument by the weight of the telephone receiver in the cradle of the phone. In order to provide a simple means for pushing down and/or releasing the spring urged pin of the more recently designed models, devices of the tye disclosed in the aforementioned patent become extremely cumbersome to use and are completely inadequate for eliminating the necessity of repeatedly replacing the receiver on the cradle of the telephone unit when it is desired to terminate a phone call.

SUMMARY OF THE INVENTION

The present invention, which will be described subsequently in greater detail, comprises a telephone switch control clip adapted for attachment to the hand-held receiver of a conventional telephone and includes a member having a shape closely following the peripheral contour of the hand-held receiver of the telephone instrument and movable with respect to the hand-held receiver to selectively engage and disengage the telephone push pin to selectively open and close the telephone circuit.

It is therefore an object of the present invention to provide a new and improved telephone switch control clip particularly adapted for use in conjunction with telephone receiver hand-held sets carrying the spring biased on-off pins thereon.

It is a further object of the present invention to provide a telephone switch control clip of the type described herein which is extremely simple in its construction, design, and use. Thus, it is inexpensive to manufacture and requires virtually no maintenance.

Other objects, advantages and applications of the present invention will become apparent to those skilled in the art of telephone apparatuses and the like when the accompanying description of several examples of the best modes contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein.

DESCRIPTION OF THE PREFERRED EMBODIMENTS

Figure 1:
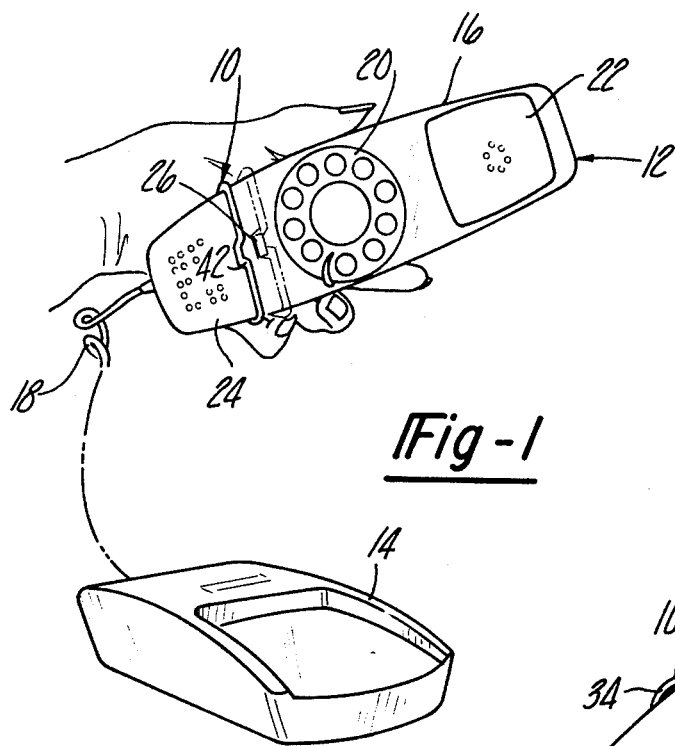
FIG. 1 is a perspective view of a conventional telephone instrument on which is mounted one example of the present invention in the form of a telephone switch control clip.

Referring now to the drawing and, in particular, to FIG. 1 wherein there is illustrated one example of the present invention in the form of a telephone switch control clip 10 carried by a conventional telephone instrument 12. The telephone instrument 12 is conventional in its construction and comprises a cradle 14 which encloses the various electrical components associated with the telephone instrument 12. The cradle 14 is connected to a hand-held receiver unit 16 by means of an electrical wire 18. The hand-held receiver 16 has a dial portion 20 to permit the user to selectively make phone calls as desired. The receiving unit 16 further comprises an ear piece 22 and a mouth piece 24, both of which function in a conventional manner to permit the user to utilize the phone as desired. The hand-held receiver 16 further comprises a spring urged push button 26 that extends upwardly through the housing of the hand-held receiver 16. The push button 26 is normally spring biased outwardly so that the weight of the telephone receiver unit 16, when disposed in the cradle 14, will normally hold the push button 26 in a retracted position against the spring urging the same outwardly. In the retracted position the button 26 contacts and holds an internal switch element within the telephone receiver unit 16 in an open position; that is, the circuit of the telephone instrument 12 is terminated. When the telephone receiver unit 16 is lifted from the cradle 14, the spring moves the button 26 outwardly to an extended position, closing the switch within the telephone receiver unit 16 to connect the telephone receiver electrically with the telephone circuit so that a message may be received and/or sent through the telephone receiver unit 16 in the conventional manner.

Figure 2:
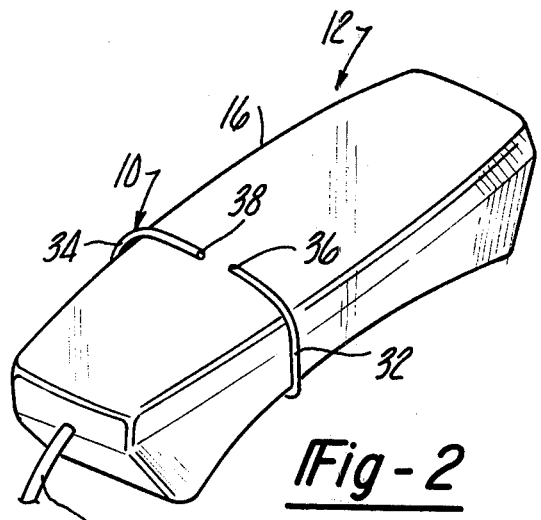
FIG. 2 is a perspective view of the telephone hand-held receiver shown in FIG. 1 illustrating the back side of the telephone switch control clip.
Figure 3:
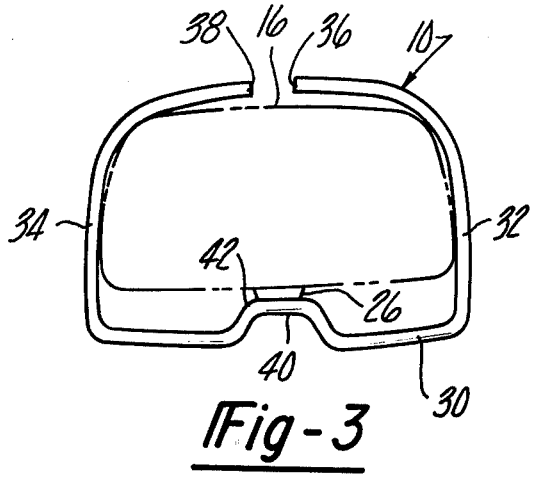
FIG. 3 is a side elevational view of the telephone switch control clip used in conjunction with the conventional telephone illustrated in FIGS. 1 and 2 with a peripheral outline of the conventional telephone being shown in phantom lines.

Referring now to FIGS. 2 and 3 for an aid in the description of applicant's inventive telephone switch control clip 10, it can be seen that the clip 10 has a generally circular shape with a flattened base 30, such that the clip 10 generally follows the peripheral crosssectional contour of the hand-held receiver unit 16. The flattened base 30 is integral with curved legs 32 and 34, which respectively terminate at ends 36 and 38, which are spaced apart a sufficient distance to permit the width of the electrical wire 18 to pass therethrough, for a purpose to be described hereinafter. As can best be seen in FIG. 3, the base 30 is provided with a recessed portion 40 which defines a projection 42 centrally located on the base 30 and projecting inwardly a sufficient distance such that, when the clip is longitudinally shifted along the length of the telephone receiver unit 16, the projection 42 will engage the push button 26 and depress the same so as to open the telephone circuit.

As can best be seen in FIG. 1, the clip 10 is positioned on the hand receiver by passing the wire 18 through the passage defined by the opposing ends 36 and 38 of the clip 10 and sliding clip 10 longitudinally along the length of the receiver 16 to the position illustrated in FIG. 1.

It can be seen that, when a party wishes to open the circuit simply by longitudinally shifting the clip 10 to the position illustrated in phantom lines in FIG. 1, the circuit is opened by the action of the inward projection 42 abutting the push button 26 and depressing the same. Thus, the inconvenience of removing and replacing the telephone receiver on the cradle 14 is avoided, and the hand receiver 16 may be positioned anywhere where it is convenient for the user.

Figure 4:
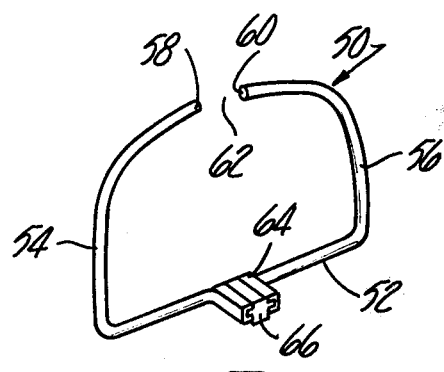
FIG. 4 is a modification of the telephone switch control clip illustrated in FIGS. 1 through 3 of the drawing.

Referring now to FIG. 4, there is illustrated a modification of the present invention in the form of a telephone switch control clip 50 which comprises a base section 52 and curved legs 54 and 56 which, respectively, terminate at opposing ends 58 and 60. The ends 58 and 60 define thereinbetween a passageway 62, which is of sufficient width to permit the clip to be passed by the wire 18 in the same manner as the clip 10 is positioned by the wire 18 and attached to the hand receiver unit 16. The clip 50 is so sized that the base 52 is in close proximity to the upper surface of the telephone receiver unit 16. The clip 50 is provided with a flattened portion 64 which has a slideable member 66 that is movable from a first position from within the portion 64 outwardly into a slidingly abutting engagement with the push button 26 so as to depress the same.

It can thus be seen that, while the clip 10 is moved along the longitudinal axis of the telephone receiver unit 16 in order to engage and disengage the push button 26, in the FIG. 4 embodiment the clip 50 remains stationary with respect to the telephone receiver unit 16 after it is initially positioned adjacent to the push button 26. The sliding member 16 is manually moved to and from the push button 26 so as to depress the push button 26 or to release the same and respectively close and open the telephone circuit.

It can thus be seen that applicant has provided a new and improved telephone switch control clip which is extremely simple in its design, construction, and use and which avoids the inconvenience of having to remove and replace the telephone receiver unit upon its telephone instrument cradle, but instead provides the user with the freedom of use in depositing the telephone receiver unit in any desired location.

It should be understood by those skilled in the art of telephone receiver units and like devices that other forms of the present invention may be had, all coming within the spirit of the present invention and the scope of the appended claims.

What is claimed is as follows:

1. A telephone switch control clip for attachment to a telephone instrument of the type having a hand-held telephone receiver unit including a push button for opening and closing the telephone circuit, the push button being in a normally extended position to close the telephone circuit, a cradle for receiving said hand-held telephone receiver unit and engaging said push button to move the same into a retracted position to open said telephone circuit, and a telephone wire connecting said hand-held receiver unit to said cradle; said clip consisting only of a one-piece member having a circular contour closely following the peripheral shape of a selected portion of said receiver and slidably movable along the longitudinal length of said receiver between a first position engaging the push button to open said circuit and a second position disengaged from said push button to close said circuit;

said clip having an inward projection formed on a portion thereof adjacent said push button when said clip is attached to said receiver unit, said projection engaging said push button when said clip is moved along said receiver to a position above said push button, said clip having a base member, a portion of which includes said inward projection for engaging said push button of said hand-held receiver unit; said clip further comprising a pair of curved legs adapted to engage the outer peripheral surface of said hand-held receiver unit, said legs ending in opposing portions which are spaced apart a sufficient distance to permit said telephone connecting wire to pass between said opposing ends, said spaced apart portions being diametrically opposite said inward projection.

* * * * *